(12) United States Patent
Topolski

(10) Patent No.: US 7,328,831 B1
(45) Date of Patent: Feb. 12, 2008

(54) METHOD OF MAKING A BRAZED METAL ARTICLE AND THE ARTICLE FORMED THEREBY

(75) Inventor: Mark J. Topolski, Hendersonville, NC (US)

(73) Assignee: Porvair PLC, Norfolk (GB)

( * ) Notice: Subject to any disclaimer, the term of this patent is extended or adjusted under 35 U.S.C. 154(b) by 181 days.

(21) Appl. No.: 10/877,136

(22) Filed: Jun. 25, 2004

(51) Int. Cl.
*B23K 31/00* (2006.01)

(52) U.S. Cl. .................. 228/227; 228/245; 228/248.1; 228/254

(58) Field of Classification Search ............ 228/248.1, 228/245, 246
See application file for complete search history.

(56) References Cited

U.S. PATENT DOCUMENTS

| | | | |
|---|---|---|---|
| 3,496,058 A | 2/1970 | Schroter et al. ............ 161/119 |
| 3,689,320 A | 9/1972 | Ashcroft et al. ............. 136/75 |
| 3,833,386 A | 9/1974 | Wood et al. ................. 106/41 |
| 3,874,983 A | 4/1975 | Hay, II et al. .............. 161/102 |
| 3,897,221 A | 7/1975 | Salyer et al. .............. 29/191.2 |
| 3,933,521 A | 1/1976 | Vissers et al. ................. 136/6 |
| 3,968,561 A | 7/1976 | Oakes et al. .................. 29/460 |
| 4,161,561 A | 7/1979 | Krug .......................... 428/213 |
| 4,169,304 A | 10/1979 | Binder ........................ 29/155 |
| 4,256,799 A | 3/1981 | Ohashi et al. .............. 428/215 |
| 4,292,361 A | 9/1981 | Ohashi et al. .............. 428/215 |
| 4,292,369 A | 9/1981 | Ohashi et al. .............. 428/313 |
| 4,366,203 A | 12/1982 | Briggs ..................... 428/304.4 |
| 4,411,679 A | 10/1983 | Pelton ........................... 65/22 |
| 4,468,431 A | 8/1984 | Okey ....................... 428/317.7 |
| 4,569,821 A | 2/1986 | Duperray et al. ............... 419/2 |
| 4,687,702 A | 8/1987 | Monsees .................. 428/308.4 |
| 4,698,278 A | 10/1987 | Prang ...................... 428/314.4 |
| 4,743,485 A | 5/1988 | Ting .......................... 428/109 |
| 4,751,137 A | 6/1988 | Halg et al. ............... 428/317.1 |
| 4,900,368 A | 2/1990 | Brotz ......................... 136/253 |
| 5,009,952 A | 4/1991 | Klepsch et al. .......... 428/319.1 |

(Continued)

FOREIGN PATENT DOCUMENTS

EP 0 185 830 7/1986

(Continued)

OTHER PUBLICATIONS

*Brazing Handbook*, Fourth Edition, prepared by American Welding Society Committee on Brazing and Soldering, 1991.

*Primary Examiner*—Kiley Stoner
(74) *Attorney, Agent, or Firm*—Kennedy Covington Lobdell & Hickman, LLP

(57) ABSTRACT

A method of making an article that is comprised of a metal foam in contact with a base metal by an intermediate braze composition, in particular, a method of brazing a metal foam to a base metal via a braze composition. In one preferred method, a polymeric foam is coated with a powdered metal composition and thermally-treated to volatilize the polymeric foam and form an open-cell metal foam. A second polymeric foam is coated with a braze composition. The second coated polymeric foam is thermally-treated to volatilize the polymeric foam. The metal foam is surrounded by the second coated polymeric foam to form a composite metal foam. The composite metal foam is placed in contact with a base metal to form an article. The article is thermally-treated to a brazing temperature to form a brazed metal article.

14 Claims, 1 Drawing Sheet

U.S. PATENT DOCUMENTS

| | | | |
|---|---|---|---|
| 5,030,488 A | 7/1991 | Sobolev | 428/35.9 |
| 5,112,697 A | 5/1992 | Jin et al. | 428/613 |
| 5,185,297 A | 2/1993 | Park et al. | 501/80 |
| 5,219,629 A | 6/1993 | Sobolev | 428/35.9 |
| 5,300,165 A | 4/1994 | Sugikawa | 156/150 |
| 5,324,333 A | 6/1994 | Doniat et al. | 29/623.5 |
| 5,334,236 A | 8/1994 | Sang et al. | 75/415 |
| 5,372,380 A | 12/1994 | Duffy et al. | 280/740 |
| 5,468,168 A | 11/1995 | Balaschak et al. | 445/26 |
| 5,522,976 A | 6/1996 | Campet et al. | 204/298.13 |
| 5,532,043 A | 7/1996 | Terashi et al. | 428/152 |
| 5,627,219 A | 5/1997 | Ogawa | 521/99 |
| 5,738,907 A | 4/1998 | Vaccaro et al. | 427/172 |
| 5,839,049 A | 11/1998 | Ettel et al. | 419/2 |
| 5,849,407 A | 12/1998 | Seibert | 428/316.6 |
| 5,851,459 A | 12/1998 | Chen | 264/46.7 |
| 5,881,353 A | 3/1999 | Kamigata et al. | 419/2 |
| 5,895,726 A | 4/1999 | Imam et al. | 428/615 |
| 5,900,320 A | 5/1999 | Ogawa et al. | 428/457 |
| 5,926,685 A | 7/1999 | Krebs et al. | 419/2 |
| 5,930,580 A | 7/1999 | Everett | 419/2 |
| 5,937,263 A | 8/1999 | Eisenmann et al. | 419/2 |
| 5,943,543 A | 8/1999 | Uchida et al. | 419/2 |
| 5,972,285 A | 10/1999 | Knott | 419/2 |
| 5,972,521 A | 10/1999 | Huskamp et al. | 428/547 |
| 5,976,454 A | 11/1999 | Sterzel et al. | 419/2 |
| 5,993,502 A | 11/1999 | Motoki et al. | 55/487 |
| 6,040,266 A | 3/2000 | Fay, III et al. | 502/439 |
| 6,051,117 A | 4/2000 | Novak et al. | 204/252 |
| 6,080,219 A | 6/2000 | Jha et al. | 55/486 |
| 6,080,357 A | 6/2000 | Sugikawa | 419/2 |
| 6,080,375 A | 6/2000 | Mussmann et al. | 423/213.5 |
| 6,083,002 A | 7/2000 | Martin et al. | 433/90 |
| 6,085,965 A | 7/2000 | Schwartz et al. | 228/190 |
| 6,087,024 A | 7/2000 | Whinnery et al. | 428/613 |
| 6,090,232 A | 7/2000 | Seeliger et al. | 156/79 |
| 6,094,798 A | 8/2000 | Seeliger et al. | 29/469 |
| 6,096,416 A | 8/2000 | Altenberg | 428/317.7 |
| 6,140,266 A | 10/2000 | Corrigan et al. | 502/439 |
| 6,196,307 B1 * | 3/2001 | Ozmat | 165/185 |
| 6,238,819 B1 | 5/2001 | Cahill et al. | 429/162 |
| 6,383,687 B1 | 5/2002 | Gibbons et al. | 429/233 |
| 6,391,250 B1 | 5/2002 | Wolfsgruber et al. | 419/2 |
| 6,397,450 B1 * | 6/2002 | Ozmat | 29/428 |
| 6,706,239 B2 | 3/2004 | Haack et al. | 419/2 |
| 2002/0104405 A1 * | 8/2002 | Haack et al. | 75/249 |
| 2005/0092181 A1 * | 5/2005 | Shih et al. | 95/283 |

FOREIGN PATENT DOCUMENTS

| | | |
|---|---|---|
| EP | 0 552 133 A1 | 7/1993 |
| EP | 1 008 406 A2 | 6/2000 |
| JP | 60050395 A | 3/1985 |
| WO | WO99/52661 | 10/1999 |

\* cited by examiner

METHOD OF MAKING A BRAZED METAL ARTICLE AND THE ARTICLE FORMED THEREBY

FIELD OF THE INVENTION

The present invention relates to a method of making a brazed metal article, more particularly a brazed metal article comprising a foam.

BACKGROUND OF THE INVENTION

Methods are known for forming a metal article from a metal foam and one or more metal components. Often the metal foam is contacted or joined to the metal component or components by a conventional bonding technique such as brazing, welding, soldering and crimping.

It is understood by those skilled in the art that brazing is the joining of similar or dissimilar metals with a filler metal or alloy of lower melting point than that of the metals being joined. A brazing metal or alloy must have high fluidity and the ability to "wet" or alloy with the metals being joined when at the brazing temperature. For certain applications, brazing has many advantages over other joining methods, including high resistance to vibration and impact and a strong bond in high-temperature service. Additionally, brazing is an optimal joining technique for articles that will be used in high-pressure service because of the small clearances between the metals to be joined and the deep penetration of the brazing metal or alloy into the joint. A brazing metal or alloy may be provided in many forms, including, but not limited to, a paste, a spray, wires and foils.

In a known method, metal foam is contacted to or joined with a metal component using a braze metal in the form of foils. For example, in a known method, a cylinder of polymeric foam that has been impregnated with a slurry coating of powdered metal and thermally-treated to volatilize the polymeric foam and sinter the metal is surrounded by a braze metal foil and inserted into a solid metal component such as a tube. The entire assembly is then placed into a sintering furnace and thermally-treated to braze the metal foam and metal tube together.

However, there are problems associated with this and many other known methods of brazing. For example, with a metal foam in a metal tube, one such problem is that upon thermally-treating, the polymeric foam is volatilized leaving behind a metal foam structure composed of metallic ligaments or struts that are in contact with the metal tube. Since the metal foam is not solid, but rather a web-like structure composed of metal struts, the actual contact surface area between the metal foam and metal tube is relatively small. Consequently, many gaps are created between the metal foam and the metal tube. Such gaps may create numerous problems including a reduction in heat transfer efficiency and strength. Further, when using a braze material such as foils, it is difficult to maintain the foil positioning when the metal foam wrapped in foil is inserted into the metal tube. The resulting assembly may have insufficient braze material in portions of the joint to sufficiently wet the metal foam and metal tube and therefore join the metal foam to the metal tube. These problems are surprisingly solved by the present invention.

SUMMARY OF THE INVENTION

The present invention relates to a method of making an article that is comprised of a metal foam in contact with a base metal by an intermediate braze composition. In particular, the present invention relates to a method of brazing a metal foam to a base metal via a braze composition. In one preferred method of the present invention, a polymeric foam is coated with a powdered metal composition and thermally-treated to volatilize the polymeric foam and form an open-cell metal foam. In this method, a second polymeric foam is coated with a braze composition. The second coated polymeric foam may be thermally-treated to volatilize the polymeric foam. The open-cell metal foam is surrounded by the second coated polymeric foam to form a composite metal foam. The composite metal foam is placed in contact with a base metal to form an article. The article is thermally-treated to a brazing temperature to form a brazed metal article. An advantage of this preferred method of the present invention is that it increases the points of contact between the metal foam and base metal by providing additional structure to facilitate contact and therefore reduces the number of gaps or spaces associated with the metal foam structure. Additionally, the braze composition strengthens the bond between the metal foam and base metal by creating additional points of contact where the braze composition wets the metal foam and base metal. As a result, a strong, continuous bond, which allows increased heat-transfer, is created between the metal foam and the base metal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENTS

Figure 1:
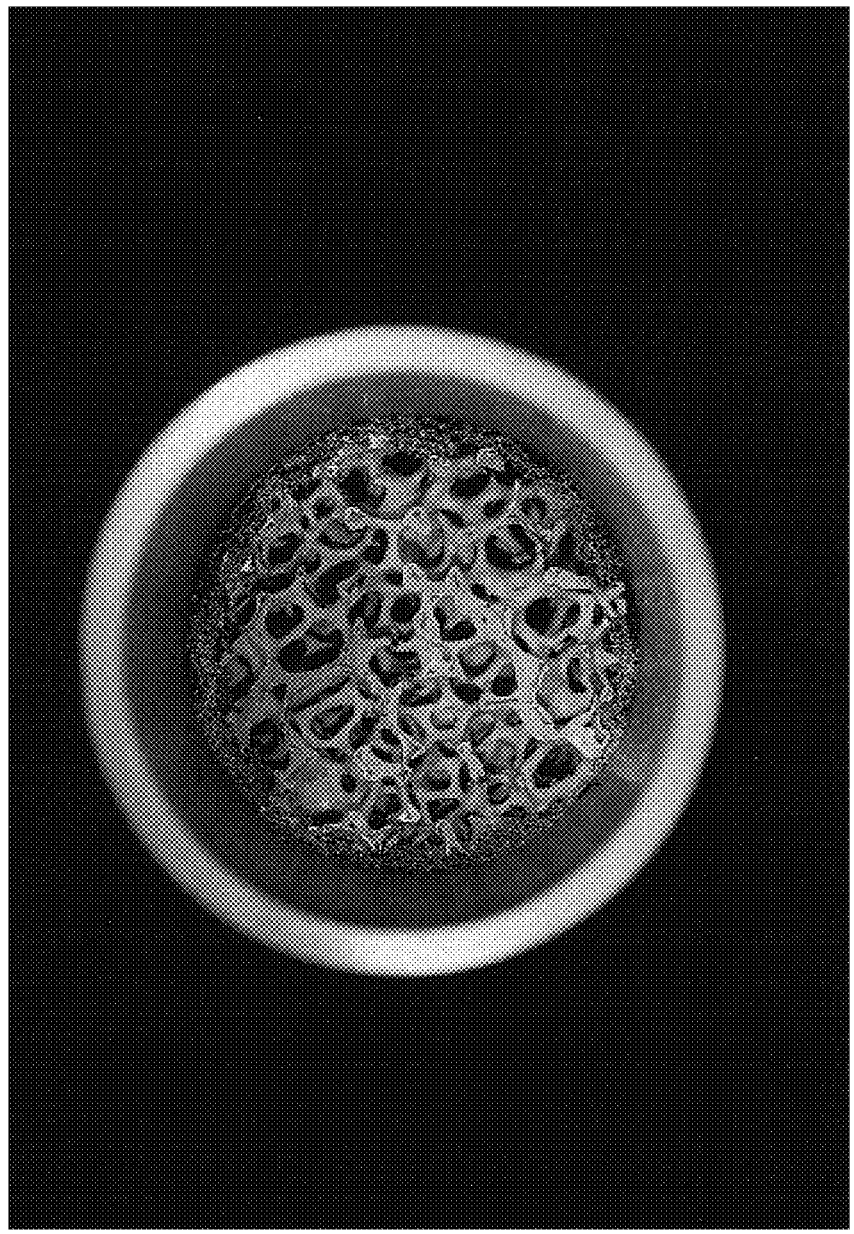
FIG. 1 is a photograph of a brazed metal article formed in accordance with the method of the present invention.

The following description of the preferred embodiment(s) is merely exemplary in nature and is in no way intended to limit the invention, its application, or uses.

The present invention relates to a method of making a brazed metal article wherein the brazed metal article comprises a metal foam. The present invention also relates to the brazed metal article formed by the method of the present invention.

The term "brazing," as used in the context of the present invention, refers to the joining or bonding of a metal foam and a base metal by the application of heat to a braze composition present between the metal foam and the base metal. Heat is applied to the braze composition until a temperature is reached at which the metal foam and base metal are fused together via the braze composition. A permanent metallic bond is formed at the interface between the metal foam and the base metal upon cooling. The metallic bond results from the braze composition being distributed by capillary action between the surfaces of the metal foam and the base metal.

The term "braze composition," as used in the context of the present invention, refers to any composition that comprises a braze metal and optionally a base metal. A braze composition can be in many forms including, but not limited to, a slurry and a slurry-coated polymeric foam. The braze composition may comprise additives and components other than braze metal such as binders, thickening agents, and water. Examples of suitable binders include, but are not limited to, organic adhesives, starches, polyvinyl alcohol, acrylic binders, xantham gum, methylcellulose, and phenolic binders.

The term "braze metal," as used in the context of the present invention, refers to a single metal, a metal alloy, or a combination of metal alloys. Examples of braze metals include, but are not limited to, the following American Welding Society classification braze alloys: BNi-3, BNi-4, BNi-6, BCo-1, BAg-8, BAg-8a, BVAg-29, and Ag. Published braze metals can be found, for example, in Brazing Handbook, Fourth Edition, prepared by the American Welding Society Committee on Brazing and Soldering 1991. A braze metal may be in powdered form and in any shape or particle size. A braze metal will be selected for a particular application based on its physical properties and the physical properties resulting from any particular combination of braze metals. Examples of such physical properties include, but are not limited to, surface tension, melting point, and viscosity.

The term "brazing temperature," as used in the context of the present invention, refers to the temperature to which the article being brazed will be brought in order to ensure that brazing has occurred. Published brazing temperatures can be found, for example, in Brazing Handbook, Fourth Edition, prepared by the American Welding Society Committee on Brazing and Soldering 1991. In order to braze a metal foam and a base metal together, the brazing temperature must be lower than the melting point of the metal or metals that comprise each of the metal foam and the base metal.

The brazing temperature is higher than the liquidus point of the braze metal. The liquidus point is the temperature at which the braze metal is completely liquid or completely melted. In contrast, the solidus point is the temperature at which the braze metal begins to form liquid or begins to melt. The melting point is actually a range of temperatures beginning with the solidus point and ending with the liquidus point.

The term "intermediate temperature," as used in the context of the present invention, refers to a temperature that is a percentage of the brazing temperature. For a given braze metal, the intermediate temperature may range from about 70% of the solidus temperature to the solidus temperature.

The term "polymeric foam" as used in the context of the present invention, refers to any foam that is comprised of a polymer. Polymeric foams that are suitable for use in the present invention include, but are not limited to, foams comprising polyurethane, polyester, polyether, cellulose and any other reticulated (open-cell) organic foam. Preferred polymeric foams are polyurethane foams. Polymeric foams are commercially available from manufacturers such as Crest Corporation.

The term "coating," as used in the context of the present invention, refers to any method of applying a powdered metal composition or a braze composition to a polymeric foam or any method of incorporating a powdered metal composition or braze composition into a polymeric foam. Any coating method that is known in the art may be used. However, there are at least two preferred coating methods. These preferred methods are impregnation and dusting. In the impregnation method, a slurry formed of a powdered metal composition or a braze composition is mixed in a mixer. The empty cavities of the polymeric foam are filled (i.e. impregnated) with the slurry. The excess of the slurry is then removed or extracted out of the polymeric foam by any means such as squeezing with rollers or via centrifuge. In the dusting method, the polymeric foam is treated with an adhesive or impregnated with a slurry containing an adhesive and then dusted with a powdered metal composition or a braze metal composition. Any excess is removed or extracted out of the polymeric foam by any means such as squeezing with rollers or via centrifuge.

The term "powdered metal composition" as used in the context of the present invention, refers to any composition that is comprised of a powdered metal. The powdered metal may be any metal that is in powder form. The powdered metal may be in any shape or particle size. Metals suitable for use in the powdered metal composition of the present invention include, but are not limited to, iron, steel, steel alloys including stainless steel, aluminum, aluminum alloys, FeCrAlY, copper, brass, bronze, nickel, nickel alloys, cobalt, platinum, palladium, silver, lead, tin, and zirconium. Powdered metals that can be used in the compositions of the present invention include, but are not limited to, the powdered metals commercially available from Ultra Fine Powder Corporation of Woonsocket, R.I., Powder Alloy Corporation of Cincinnati, Ohio and Stellite Powder Corporation of Goshen, Ind.

The powdered metal composition may comprise additives and components other than powdered metals such as binders, liquids, and shrinkage aids. Examples of suitable binders include, but are not limited to, organic adhesives, starches, polyvinyl alcohol, acrylic binders, xantham gum, methylcellulose, and phenolic binders. Examples of suitable liquids include, but are not limited to, water and solvents.

The term "thermally-treating" as used in the context of the present invention, refers to any method of raising an object to a specified temperature in a controlled atmosphere for a specified period of time. By "controlled atmosphere," it is meant that the environment is monitored and variables such as the type and quantity of chemicals present, the pressure, and the temperature, may be controlled to maintain a desired environment. This controlled atmosphere may be, for example, in a vacuum furnace, a retort furnace, or a control atmosphere furnace. Optionally, prior to thermally-treating, the polymeric foam can be dried to remove any excess liquid by any conventional means such as in a convection drier. The drying conditions, such as drying temperature and length of drying time, are not critical and are readily determined by one of ordinary skill in the art.

The manner of thermal-treatment employed depends upon many factors including the configuration and composition of the resulting article. An important consideration in thermally-treating a polymeric foam coated with a powdered metal composition is to volatilize the polymeric foam and any organics or binders in the powdered metal composition. The specific thermal-treating conditions depend upon the materials selected for a given powdered metal composition. However, the temperature that one would need to volatilize the polymeric foam in the thermal-treating step is typically a temperature below the solidus point of the powdered metal. The precise temperature and time that one would need to volatilize the polymeric foam in the thermal-treating step would be apparent to one of ordinary skill in the art. Similarly, the specific thermal-treating conditions for the braze composition depend upon the composition of the braze composition, the open-cell metal foam and the base metal. The temperature that one would need to volatilize the polymeric foam of the braze composition in the thermal-treating step is typically a temperature below the solidus point of the braze metal.

An important consideration in thermally-treating an article is to liquify at least a portion of the braze composition so that it will sufficiently wet the open-cell metal foam and base metal. The specific thermal-treating conditions depend upon the materials selected for a given braze composition. However, the temperature that one would need to thermally-treat an article is in a temperature range beginning with the solidus point of the braze composition and spanning to the brazing temperature of the braze composition. The precise temperature and time that one would need to braze the article in the thermal-treating step varies depending on the braze composition used and are available in Brazing Handbook, Fourth Edition, prepared by the American Welding Society Committee on Brazing and Soldering 1991.

The term "in contact" as used in the context of the present invention, refers to at least a portion of the open-cell metal foam touching or being adjacent to the base metal via the braze composition. The geometry of the bond and the configuration of the resulting article define the manner in which the open-cell metal foam is placed in contact with, and ultimately bonded to, the base metal. For example, in the case where the base metal is in the shape of a tube, the open-cell metal foam may be in contact with the inside or outside surfaces of the tube via the braze composition. In the case where the base metal is in the shape of a plate, the metal foam may be in contact with one or more faces of the plate. Any number of configurations is possible in contacting the open-cell metal foam with the base metal in accordance with the method of the present invention.

The term "base metal," as used in the context of the present invention, refers to any metal including, but not limited to, iron, steel, steel alloys including stainless steel, aluminum, aluminum alloys, FeCrAlY, copper, copper alloys, brass, bronze, tungsten, titanium, nickel, nickel alloys, cobalt, platinum, palladium, silver, lead, tin, zirconium, and other alloys thereof. The base metal of the present invention may be solid, slightly porous, or porous. A "solid" base metal refers to a base metal that has a density of 100% (fully dense) and has no pores. A "slightly porous" base metal has a density of about 90 to 99% and has pores. A "porous" base metal has a density of about 15% to 90% and has pores. An example of a porous base metal is MICRO-MASS® commercially manufactured by Porvair Advanced Materials, Inc. of Hendersonville, N.C.

A first preferred method of forming the brazed metal article in accordance with the present invention is as follows. A polymeric foam is coated with a powdered metal composition to form a coated first polymeric foam. Properties such as pores per inch and thickness of the polymeric foam will be chosen based on the application in which the final brazed metal article will be used. A polymeric foam having from about 3 to about 130 pores per inch will typically be used. The first polymeric foam is thermally-treated to a temperature below the solidus point of the powdered metal to volatilize the polymeric foam component of the first polymeric foam and form an open-cell metal foam. Then, a second polymeric foam is coated with a braze composition. The second polymeric foam, coated with braze composition, is placed in surrounding relation to the open-cell metal foam to form a foam composite. The foam composite is placed in contact with a base metal to form an article. The article is thermally-treated to a brazing temperature to form the brazed metal article of the present invention. Brazing temperatures for the braze composition can be found in the above mentioned Brazing Handbook. Typically, thermal-treatment is performed in a vacuum-furnace.

A second preferred method of forming a brazed metal article in accordance with the present invention is as follows. A polymeric foam is coated with a powdered metal composition to form a coated first polymeric foam. Properties such as pores per inch and thickness of the polymeric foam will be chosen based on the application in which the final brazed metal article will be used. A polymeric foam having from about 3 to about 130 pores per inch will typically be used. The coated first polymeric foam is thermally-treated to a temperature lower than the solidus point of the powdered metal to volatilize the polymeric foam component of the first polymeric foam and form an open-cell metal foam. A second polymeric foam is coated with a braze composition. The coated second polymeric foam is thermally-treated to an intermediate temperature to volatilize the polymeric foam component of the second polymeric foam and form a braze metal foam. The braze metal foam is placed in surrounding relation with the open-cell metal foam to form a thermally-treated metal foam composite. The thermally-treated metal foam composite is placed in contact with a base metal to form an article. The article is thermally-treated to the brazing temperature to form a brazed metal article. Brazing temperatures for the braze composition can be found in the above mentioned Brazing Handbook Typically, thermal-treatment is performed in a vacuum-furnace.

A third preferred method of forming a brazed metal article in accordance with the present invention is as follows. A polymeric foam is coated with a powdered metal composition to form a coated first polymeric foam. Properties such as pores per inch and thickness of the polymeric foam will be chosen based on the application in which the final brazed metal article will be used. A polymeric foam having from about 3 to about 130 pores per inch will typically be used. The coated first polymeric foam is thermally-treated to a temperature below the solidus point of the powdered metal to volatilize the polymeric foam component of the first polymeric foam and form an open-cell metal foam. A second polymeric foam is coated with a powdered metal composition to form a coated second polymeric foam. The coated second polymeric foam is thermally-treated to a temperature below the solidus point of the powdered metal to volatilize the polymeric foam component of the second polymeric foam and form a second open-cell metal foam. The second open-cell metal foam is coated with a braze composition to form a coated second open-cell metal foam. The coated second open-cell metal foam is placed in surrounding relation with the first open-cell metal foam to form an open-cell metal foam composite. The open-cell metal foam composite is placed in contact with a base metal to form an article. The article is thermally-treated to the brazing temperature to form an brazed metal article. Brazing temperatures for the braze composition can be found in the above mentioned Brazing Handbook. Typically, thermal-treatment is performed in a vacuum-furnace.

In each of the above-described methods, the first polymeric foam may be of the same material as the second polymeric foam or of a different material from the second polymeric foam. The preferred material for both is polyurethane. It is preferred that the second polymeric foam be relatively thin in dimension in comparison to the first polymeric foam. A preferred thickness range for the second polymeric foam is from about 0.03 to about 0.125 inches. Another characteristic that is considered in choosing a polymeric foam for use as a first or second polymeric foam is the pores per inch ("ppi") of the foam. One of ordinary skill in the art will consider the desirable pressure drop throughout the resulting brazed metal article and the desirable thickness of the polymeric foam when determining what ppi polymeric foam to use. For most applications, the ppi of the second polymeric foam should be at least the same as, or greater than, the ppi of the first polymeric foam, and it is more preferable that the second polymeric foam have at least twice the ppi of the first polymeric foam. However, one of ordinary skill in the art will know that for some applications, the ppi of the second polymeric foam may be less than the ppi of the first polymeric foam. A preferred ppi range for the second polymeric foam is from about 40 ppi to about 100 ppi.

An open-cell metal foam is a metal foam formed from metal particles being bound together through a thermal-treating process such as sintering. More specifically, in the present invention, the forming of an open-cell metal foam begins with a polymeric foam being coated with a powdered metal composition. The coated polymeric foam is then thermally-treated and the polymeric base of a polymeric foam, along with any binding agents, thickening agents, or liquids from the powdered metal composition, are volatilized leaving behind only the metal particles or struts from the powdered metal composition to be bound together to form the open-cell metal foam.

When an open-cell metal foam is formed, the metal particles or struts that are bound together in the metal foam have end portions that protrude from the main structure of the foam. These end portions are known to those skilled in the art as "strut-ends." The strut-ends are joined to the base metal during brazing, further strengthening the connection between the open-cell metal foam and the base metal.

Numerous applications exist for the brazed metal articles made by the method of the present invention including, but not limited to, use as advanced heat exchangers where the improved metallurgical bond serves to enhance conduction transfer through a solid tube or other material to the struts of the metal foam. Additional applications include bonding for mechanical strength and convenience in packaging. The present invention allows for further processing and packaging of the metal foam material, including the use of welding and secondary brazing operations to combine the composite with other materials and devices. Additional applications include chemical use where the metal foam is utilized as a catalyst or catalyst support to promote or enable chemical reactions. Additional applications include use in electrical applications, where the bonding serves to provide good electrical contact between conducting elements or other articles. Additional applications include the enhancement of thermal transfer process such as in steam generation and chemical processing and in the formation of a bipolar plate or current collector for a fuel cell. Numerous other applications exist that are not explicitly mentioned but are within the scope of the present invention.

The methods of the present invention provide for superior performance in the above applications and is an improvement over present technology. The braze composition fills any gaps that may exist between the struts of the open-cell metal foam and the base metal. Further, because the braze composition forms a thin and highly porous layer, the strut-ends of the open-cell metal foam are able to provide additional contact points with the base metal. The additional contact points of the strut-ends and the decreased number of gaps between the open-cell metal foam provide increased heat conduction and strength for brazed metal articles formed using the methods of the present invention.

EXAMPLES

Example 1

A brazed metal article in the form of a nickel-based open-cell metal foam brazed to the interior of a nickel-based superalloy tube by an intermediate nickel-based braze composition was prepared in accordance with the present invention. FIG. 1 is an end view of a brazed metal tube prepared in accordance with the method of Example 1.

The open-cell metal foam was manufactured according to the following procedure. An open-cell, reticulated polyurethane foam of 10 pores per 25.4 mm (20 pores per inch) designation (Stephenson & Lawyer, Inc.) was used in combination with a nickel-based superalloy (UNS number N06625) slurry composition. The abbreviation UNS stands for Unified Numbering System, which is used to give known metals and metal alloys a number that is recognizable to anyone in the world skilled in the relevant art, e.g., a person skilled in the art seeing the designation N06625 knows that it refers to this particular nickel-based superalloy. The slurry was made by combining −400 mesh nickel-based superalloy (UNS number N06625) powder (Ametek Specialty Metal Products, Inc.), a 6% solution of polyvinyl alcohol (Air Products Airvol 165), a 2.9% solution of xantham gum (CP Kelco, Kelzan), a 16.6% solution of a modified polyvinyl acetate emulsion (Chemurgy Products, Inc., Prostik 705) and water in relative quantities of 87 weight %, 1.0 weight %, 5.0 weight %, 2.0 weight %, and 5.0 weight % respectively based on the total weight of the composition. The ingredients were mixed thoroughly to form the desired slurry.

The polymeric foam was cut to its cylindrical dimension of 33 mm diameter, by 268 mm length using a thin-blade core drill on a drill press. The polymeric foam was then coated by impregnating it with the slurry by dipping the polymeric foam into the slurry and pressing out the excess under a mechanized roller so that the weight of the slurry remaining within the polymeric foam material corresponded to 10% of the theoretical density of the nickel-based superalloy foam (UNS number N06625) for the cylindrical geometry. Following this coating procedure, the slurry-impregnated foam cylinder was dried in a convection oven at approximately 170° F. for about 2 hours.

The impregnated and dried polymeric foam was then thermally treated in a vacuum furnace according to the following cycle to form an open-cell metal foam: 1) heated from room temperature to 1025° F. at 7° F./min., held at 1500 microns of mercury of argon partial pressure, 2) held at 1025° F. for 90 minutes, 3) heated at 10° F./min. to 2050° F., held at 1500 microns of mercury of argon partial pressure, 4) held at 2050° F. for 60 minutes, 5) heated at 1.0° F./min. to 2100° F., held at 750 microns of mercury of argon partial pressure, 6) held at 2100° F. for 60 minutes, 7) heated at 10° F./min. to 2250° F., held at 750 microns of mercury of argon partial pressure, 8) held at 2250° F. for 60 minutes, 9) force-cooled using a gas quench to 180° F. and held for 30 minutes, under −5 microns of mercury of argon partial pressure.

The open-cell metal foam was then cut using a conventional wire electro-discharge machining tool to a length of 230 mm. Specifically, one end of the open-cell metal foam was cut to face or create a smooth surface on the applicable end and the other end was cut to reduce the length of the open-cell metal foam to 230 mm.

The open-cell metal foam was then coined to have a diameter slightly less than 28 mm, which was the inside diameter of the metal tube into which it was to be inserted. To coin the metal foam, the metal foam was placed into a conventional coining die comprised of two cylindrical halves that have the desired diameter of slightly less than 28 mm when they are placed together to form a complete cylinder bore form. The coining die was placed into a conventional coining press to form the metal foam to have an outside diameter of slightly less than 28 mm.

To prepare the base metal tube for brazing, the inside diameter of a conventional 28 mm nickel-based superalloy tube (UNS number 06625) was abrasively cleaned using an appropriately-sized honing tool, which is commonly available at automotive parts stores. The honing tool was moved in an axial direction through the bore of the tube until the inside diameter of the tube was cleaned of surface oxides.

The braze composition was manufactured according to the following procedure. An open-cell, reticulated polymeric foam with 60 ppi was cut using conventional scissors into a piece having a width of 80 mm, a length of 460 mm, and a thickness of 1.5 mm. The open-cell, reticulated polymeric foam was used in combination with a nickel-based braze slurry. The braze slurry was made by combining 302.48 grams of −325 mesh nickel-based superalloy powder (UNS number N06625), 302.48 grams of BNi-3 braze alloy powder, 120.86 grams of deionized water, 7.94 grams of Rheolate 255 (Elementis plc), and 60.43 grams of Rhoplex HA-8 (Rohm & Haas Co.). The ingredients were mixed thoroughly to form the desired slurry. The polymeric foam was then coated by impregnating it with 50-55 grams of the braze slurry. Following the coating procedure, the braze coated polymeric foam was wrapped around the open-cell metal foam cylinder in a clockwise helical fashion while slightly stretching the braze coated polymeric foam to form a metal foam composite. Excess braze coated polymeric foam was trimmed off the ends of the metal foam composite to result in flush ends for the metal foam composite.

The metal foam composite was inserted into the nickel-based superalloy tube by twisting the metal foam composite in a counter clockwise direction and sliding it into the bore of the tube. The tube, along with the metal foam composite insertion, was then placed in a vacuum furnace and thermally-treated according to the following cycle: 1) heated from room temperature to 1950° F. at 12° F./minute, held at 1500 microns of mercury of argon partial pressure, 2) held at 1950° F. for 30 minutes, 3) heated at 3° F./min to 2050° F., held at 1500 microns of mercury of argon partial pressure, 4) held at 2050° F. for 30 minutes, 5) vacuum furnace cooled to 1800° F., under 1500 microns of mercury of argon partial pressure, 6) held at 1800° F. for 5 minutes, under 1500 microns of mercury of argon partial pressure and 7) force-cooled using a gas quench to 180° F. and held for 30 minutes, under −5 microns of mercury of argon partial pressure.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of making a brazed metal article, the method comprising:
    providing a first polymeric foam;
    coating the first polymeric foam with a powdered metal composition to form a coated first polymeric foam;
    thermally-treating the coated first polymeric foam to volatilize the first polymeric foam and to form an open-cell metal foam;
    providing a second polymeric foam;
    coating the second polymeric foam with a braze composition to form a coated second polymeric foam;
    thermally-treating the coated second polymeric foam to an intermediate temperature to volatilize the second polymeric foam and to form a thermally-treated metal foam;
    applying the thermally-treated metal foam to the open-cell metal foam to form a thermally-treated metal foam composite;
    placing the thermally-treated metal foam composite in contact with a base metal to form an article; and
    thermally-treating the article to a braze temperature to partially-liquefy or fully-liquefy the applied thermally-treated metal foam of the thermally-treated metal foam composite to form a brazed metal article.

2. The method as claimed in claim 1, wherein the first polymeric foam is selected from a group consisting of polyurethane, polyester, polyether, cellulose and any other reticulated (open-cell) organic foam.

3. The method as claimed in claim 2, wherein the first polymeric foam is polyurethane.

4. The method as claimed in claim 1, wherein the first polymeric foam has from about 3 to about 130 pores per inch.

5. The method as claimed in claim 1, wherein the second polymeric foam is selected from a group consisting of polyurethane, polyester, polyether, cellulose and any other reticulated (open-cell) organic foam.

6. The method as claimed in claim 5, wherein the second polymeric foam is polyurethane.

7. The method as claimed in claim 1, wherein the second polymeric foam has from about 3 to about 130 pores per inch.

8. The method as claimed in claim 1, wherein the first polymeric foam and the second polymeric foam are polyurethane.

9. The method as claimed in claim 1, wherein the second polymeric foam has a greater number of pores per inch than the first polymeric foam.

10. The method as claimed in claim 1, wherein the second polymeric foam has at least twice the number of pores per inch as the number of pores per inch of the first polymeric foam.

11. The method as claimed in claim 1, wherein the braze composition comprises a braze metal.

12. The method as claimed in claim 11, wherein the braze metal is selected from the group consisting of BNi-3, BNi-4, BNi-6, BCo-1, BAg-8, BAg-8a, BVAg-29, and Ag.

13. The method as claimed in claim 1, wherein the base metal is solid, slightly porous, or porous.

14. The method as claimed in claim 1, wherein the brazed metal article is a metal tube.

* * * * *